US012026663B1

(12) United States Patent
Kalm

(10) Patent No.: US 12,026,663 B1
(45) Date of Patent: Jul. 2, 2024

(54) AUTOMATED SEQUENCING AND DISPENSING IN FINAL SEGMENT OF DELIVERY

(71) Applicant: Amazon Technologies, Inc., Seattle, WA (US)

(72) Inventor: William Scott Kalm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 375 days.

(21) Appl. No.: 17/472,183

(22) Filed: Sep. 10, 2021

(51) Int. Cl.
*B65G 1/137* (2006.01)
*B65G 1/04* (2006.01)
*G06Q 10/087* (2023.01)

(52) U.S. Cl.
CPC .......... *G06Q 10/087* (2013.01); *B65G 1/045* (2013.01); *B65G 1/137* (2013.01)

(58) Field of Classification Search
CPC ........ B60P 3/007; B60P 1/5409; B65D 88/54; B65G 1/0457; B65G 1/045; B65G 1/137
See application file for complete search history.

(56) References Cited

U.S. PATENT DOCUMENTS

| 9,656,805 | B1* | 5/2017 | Evans ................... G08G 5/0069 |
| 10,525,865 | B2* | 1/2020 | Wilkinson ............... B60P 3/20 |
| 2020/0074404 | A1* | 3/2020 | Gil, Jr. .................. G05D 1/0011 |
| 2022/0250527 | A1* | 8/2022 | Lundeen ................... B60P 1/38 |
| 2022/0281372 | A1* | 9/2022 | Seemüller ............... B66C 13/22 |

FOREIGN PATENT DOCUMENTS

| DE | 102006025876 A1 * | 12/2007 | ............... B60P 1/00 |
| EP | 3228496 A2 * | 10/2017 | ............... B60P 3/00 |

\* cited by examiner

*Primary Examiner* — Kaitlin S Joerger
(74) *Attorney, Agent, or Firm* — Kilpatrick Townsend & Stockton LLP

(57) ABSTRACT

An item delivery system can include a carrier positioned on a rail. The rail can be positioned in a delivery vehicle, for example. The carrier can include rigid or semi-rigid sidewall and dividers to form item slots. The item slots can receive one or more items. The carrier can be positioned on the rail and moved around the rail by an advancement device. The advancement device can engage with a portion of the carrier to move the carrier. The carrier can be moved to a position for removal of items from the carrier. The removal position may correspond to an area accessible from an operator area of the delivery vehicle, for example.

20 Claims, 10 Drawing Sheets

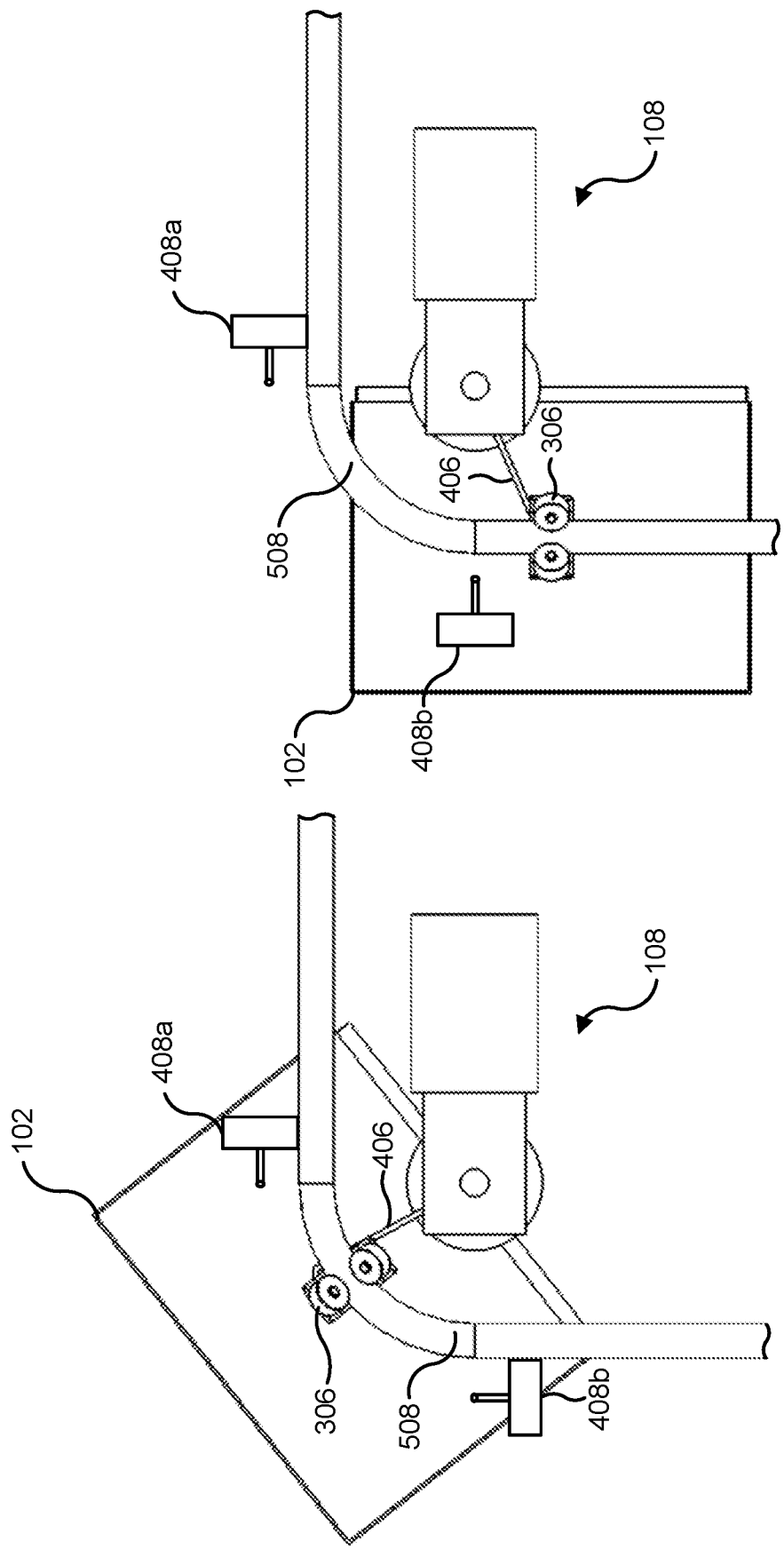

AUTOMATED SEQUENCING AND DISPENSING IN FINAL SEGMENT OF DELIVERY

BACKGROUND

Items can be delivered using postal services, courier services, or other similar services. However, prior to delivery, the items are typically sorted and packaged in a warehouse facility. The sorting and packaging of individual or grouped items can be a time intensive process and the packaging material is often discarded shortly after the item is delivered. The items can be shipped to customers using traditional delivery methods, however, these delivery methods can be long and slow and can cause the items to be moved and handled frequently. Additionally, items that are being shipped to customers located in a similar area are often shipped separately and delivered to the customers using delivery vehicles with limited capacity.

BRIEF DESCRIPTION OF THE DRAWINGS

Various embodiments in accordance with the present disclosure will be described with reference to the drawings, in which:

FIGS. 5A through 5E are top views that illustrate indexing of a hanging carrier using the item delivery system of FIG. 1, according to various embodiments;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to, among other things, systems and techniques relating to an item delivery system for moving items, but particular examples are described that include carriers that can receive one or more inventory items. The carriers can be hung from a rail that is positioned in an item delivery truck. The rail can form a closed loop such that the carriers can be continuously moved around the rail. The carriers can be moved by one or more advancement devices. The advancement devices position a desired carrier at an item removal location. While the desired carrier is at the item removal location, one or more items can be removed from the carrier (e.g., from the item spaces or slots) by a user.

Turning now to a particular example, in this example, an item delivery system positioned in a truck or other item delivery vehicle is provided. The item delivery system can include carriers that can hang from a continuous elliptic rail positioned in the item delivery vehicle. The carriers can include rigid or semi-rigid sidewalls and rigid or semi-rigid dividers. The carriers can include item slots for receiving inventory items and a yoke for hanging the carriers on the continuous elliptic rail. The continuous elliptic rail can form a continuous pathway that can allow the carriers to be continuously moved around the continuous elliptic rail. For example, the carriers can be indexed (e.g., moved one at a time) The carriers can be indexed using one or more advancement devices. The advancement devices can include an arm that can engage with part of the carriers to index the carriers around the continuous elliptic rail. The carriers can be indexed until a desired carrier is positioned at an item removal location. For example, the carriers can be indexed while the item delivery vehicle is moving to a delivery location. When the desired carrier is at the item removal location, an item can be removed from the carrier (e.g., by a user). The carriers can then continue to be indexed until a second carrier is positioned at the item removal location and a second item can be removed from the second carrier. For example, the second carrier can be moved to the item removal location while the item delivery vehicle is moving to a second delivery location.

Figure 1:
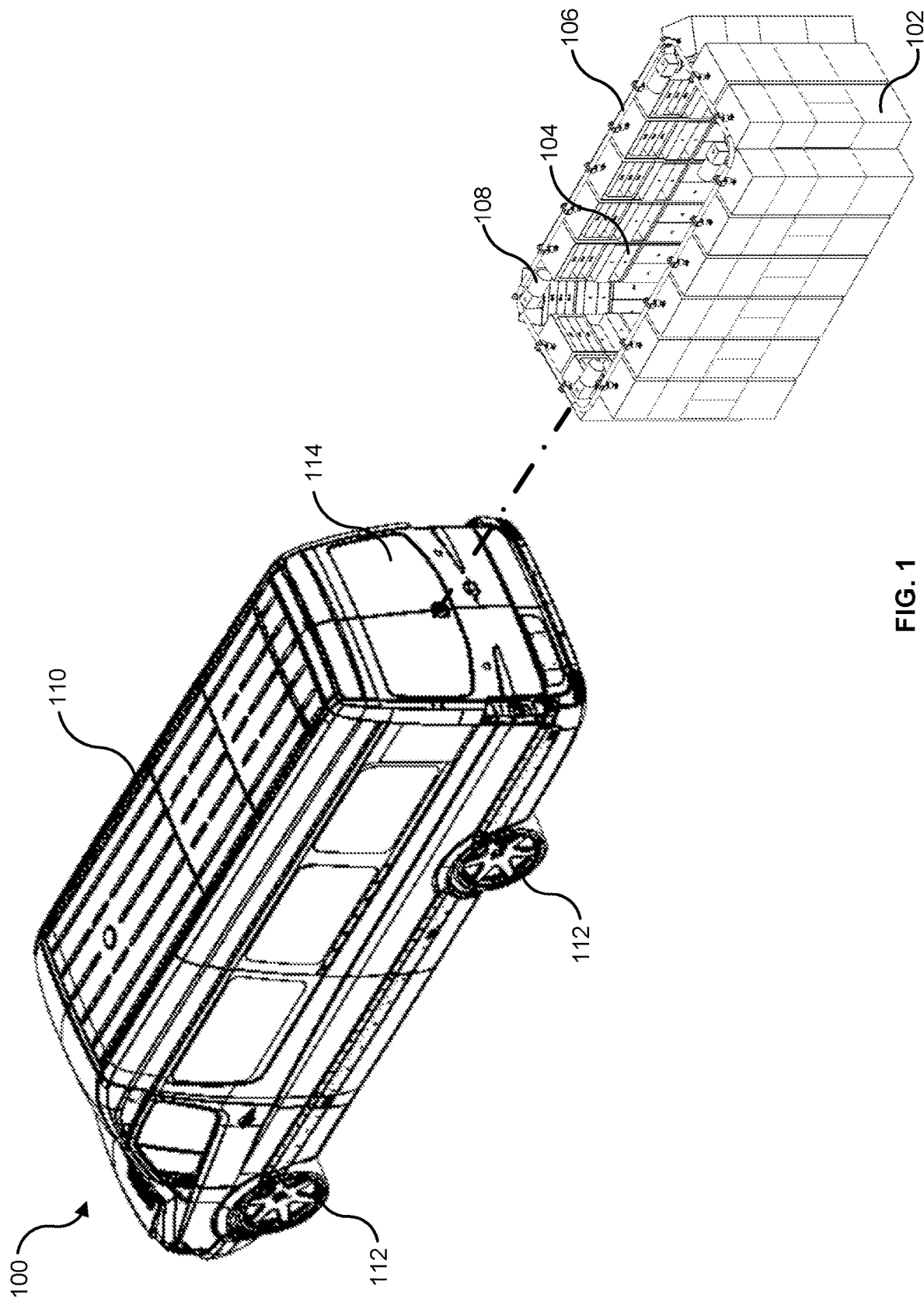
FIG. 1 is an exploded perspective view that illustrates an item delivery system, according to various embodiments.

Turning now to the figures, FIG. 1 illustrates an exploded view of an item delivery system 100. The item delivery system can include carriers 102 (e.g., hanging carriers) that can hang from a rail 106. The rail can be positioned in an item delivery vehicle 110. The carriers 102 can hold one or more items 104 (e.g., inventory items) in item slots. The rail 106 can be a closed loop (e.g., a continuous rail) such that the rail 106 forms a continuous pathway for the carriers 102. For example, the rail 106 can be a continuous rail such that the carriers 102 can be continuously moved around the rail 106. In some embodiments, the rail 106 can include straight portions and curved portions. For example, the straight portions can be connected together by curved portions (e.g., corner portions) to form a loop.

In various embodiments, the item delivery vehicle 110 can transport the item delivery system 100. For example, the item delivery vehicle 110 can include a drivetrain (e.g., wheels 112) that can be used to move the item delivery vehicle 110. The item delivery vehicle 110 can move along a pre-determined delivery route. For example, a route with delivery locations may be determined prior to the item delivery vehicle 110 leaving a loading area and/or before the carriers 102 are positioned in the item delivery vehicle 110. However, the delivery route may be updatable such that the order of the delivery locations changes. The item delivery vehicle 110 can be operated by a user (e.g., by an operator). However, the item delivery vehicle 110 may be remotely and/or autonomously controlled. The item delivery vehicle 110 can be or include a truck, a van, a car, an unmanned vehicle, a trailer with a drivetrain, and/or any suitable vehicle.

The carriers 102 can be moved along the rail 106 by one or more advancement devices 108. For example, as shown in FIG. 1, advancement devices 108 can be positioned at each of the corners of the rail 106. However, any suitable number of advancement devices 108 can be positioned at any suitable position along the rail 106. The advancement devices 108 can move the carriers 102 to an item unloading position. At the item unloading position, one or more items 104 can be removed from the carriers 102. For example, a user can remove one or more items 104 from a carrier 102 positioned at the item unloading position.

In various embodiments, the advancement devices 108 can index the carriers 102. For example, the carriers 102 can be indexed such that the carriers 102 are moved forward one position (e.g., a carrier 102 is moved forward to a position that was occupied by an adjacent carrier 102). Indexing the carriers 102 can allow each of the carriers 102 in turn to be stopped (at least momentarily) at the item removal position.

In various embodiments, the carriers 102 can be positioned to completely fill the rail 106 (e.g., the carriers 102 are distributed around the rail 106 and touching one another). Moving one of the carriers 102 (e.g., using the advancement devices 108) can cause the carrier 102 to engage with (e.g., run into) the other adjacent carriers 102. Engaging with the adjacent carriers 102 can cause those carriers 102 to move. The carriers 102 can be moved (e.g., by running into one another) until the carriers 102 are, for example, stopped. As described in more detail herein, the carriers 102 can be stopped by one or more stops positioned around the rail 106.

In some embodiments, the item delivery vehicle 110 can include access doors 114. The access doors 114 can allow a user and/or an operator to access the interior of the item delivery vehicle 110 (e.g., access the carriers 102 and/or items 104). For example, a user and/or an operator can access the interior of the item delivery vehicle 110 (e.g., via the access doors 114) to deposit items 104 into the item delivery vehicle 110 and/or remove items 104 from the item delivery vehicle 110.

Figure 2:
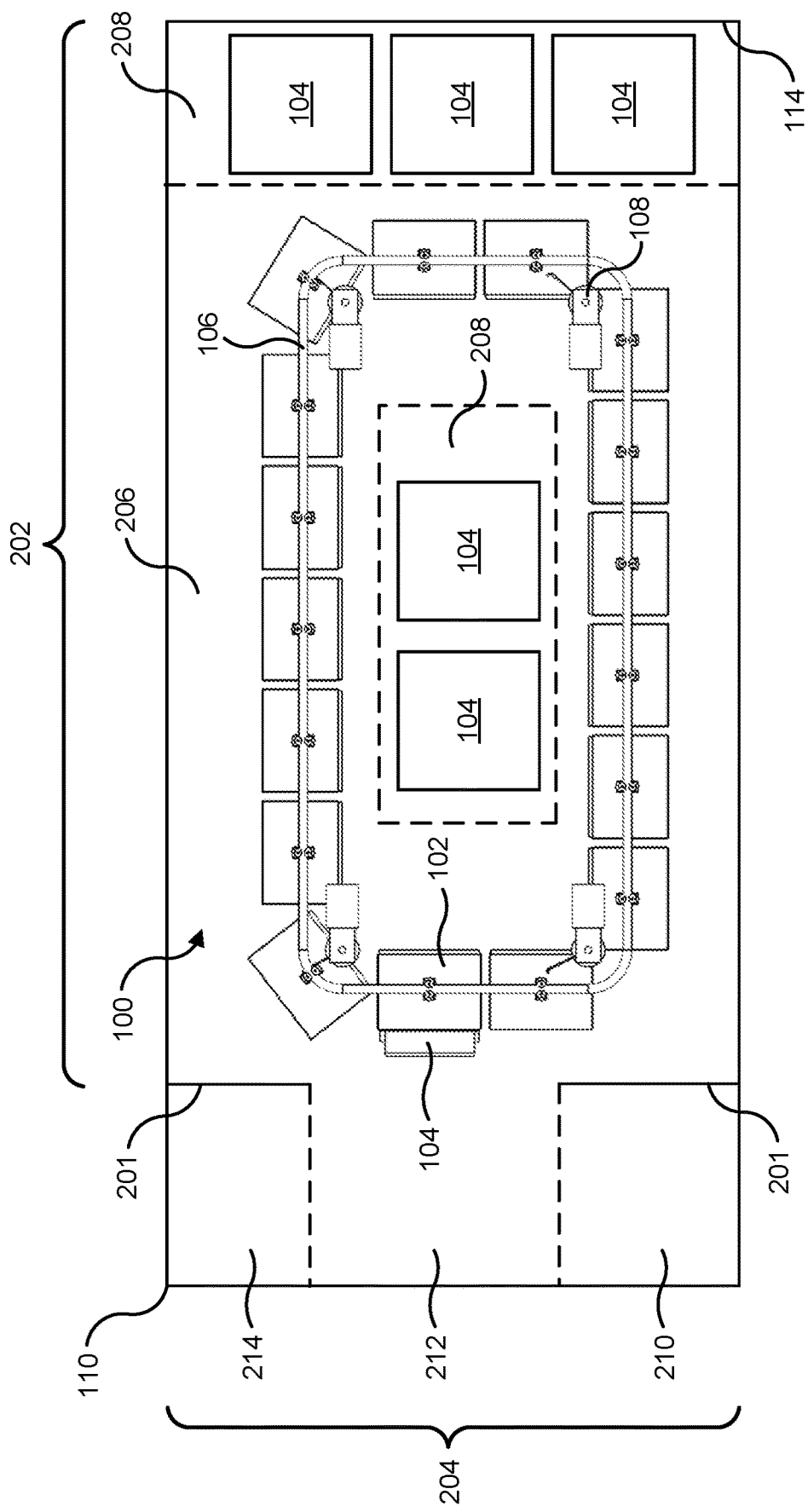
FIG. 2 is a top view that illustrates the item delivery system of FIG. 1 positioned in an item delivery truck, according to various embodiments.

Turning to FIG. 2, the item delivery system 100 from a top view is shown positioned in the item delivery vehicle 110. The item delivery vehicle 110 can be any suitable vehicle for delivering the items 104.

The item delivery vehicle 110 can be separated into various zones. The zones can be separated with a physical divider 201 (e.g., a wall), however, the zones may not be physically separated and zone may refer to a general area of the item delivery vehicle 110. The item delivery vehicle 110 can include an inventory item area 202 and an operator area 204. In some embodiments, the inventory item area 202 and the operator area 204 can at least partially be separated by the physical divider 201. For example, the physical divider 201 can at least partially separate an operator from the inventory item area 202 when the operator is driving the item delivery vehicle 110 or otherwise present in the vehicle at or between stops.

In various embodiments, the inventory item area 202 and/or the operator area 204 can include sub-areas. For example, the inventory item area 202 can include a delivery system area 206 and a secondary area 208. The item delivery system 100 can be positioned in the delivery system area 206. For example, various elements of the item delivery system 100 can be mounted to the item delivery vehicle 110 (e.g., onto a ceiling and/or another interior wall of the item delivery vehicle 110). However, the item delivery system 100 may be moveable such that some or all of the item delivery system 100 can be moved into and/or out of the item delivery vehicle 110 (e.g., via doors and/or an opening in the item delivery truck). The secondary area 208 can be or include an over-sized item area for positioning items 104 that are too large to be positioned in the carriers 102. The secondary area 208 can be an area that is easier for a user and/or an operator (e.g., a driver) to access. For example, the secondary area 208 can be positioned next to the access doors 114.

In some embodiments, the secondary area 208 can additionally or alternatively be positioned in the middle of the item delivery system 100 and/or at least partially within the delivery system area 206. For example, the rail 106 can create a pathway such that the carriers 102 move around the secondary area 208. One or more of the carriers 102 can include an access area that can allow a user to access the secondary area 208 that is positioned in the middle of the item delivery system 100. However, the secondary area 208 may be accessed by a gap between carriers 102.

In some embodiments, the secondary area 208 can receive packaging (e.g., item packaging and/or corrugate). Additionally or alternatively, the secondary area 208 can receive a robotic manipulator. The robotic manipulator can include an end effector for interacting with the carriers 102 and/or the items 104. The robotic manipulator can be or include a robotic arm, an unmanned aerial vehicle, an unmanned vehicle, and/or any suitable manipulator for interacting with the carriers 102 and/or the items 104. For example, the robotic manipulator can be or include a robotic manipulator with an end effector that can remove the items 104 from the carriers 102.

In various embodiments, the operator area 204 can include one or more sub-areas. For example, the operator area 204 can include a driving area 210, an item removal area 212, and/or a packaging area 214. The driving area 210 can be or include an area where a user (e.g., a driver) can operate the item delivery vehicle 110. For example, the driving area 210 can include a seat, a steering apparatus, and control pedals that can allow the user to control the item delivery vehicle 110 (e.g., drive the truck along a delivery route). However, the driving area 210 can be or include an area (e.g., a protected area) where a user can stand when the item delivery vehicle 110 is in motion. For example, the driving area 210 can be a protected area where a user can stand while the item delivery vehicle 110 is being remotely and/or autonomously driven.

The item removal area 212 can be used to access items 104 positioned in the carriers 102. For example, the item removal area 212 can allow a user to access a carrier 102 positioned in the item removal position. The item removal area 212 can include an opening in the physical divider 201 such that a user can access the carriers 102. For example, the opening in the physical divider 201 can allow a user to access all of the items 104 positioned in the carriers 102. The user can remove the items 104 from the carriers 102 without needing to remove the carriers 102 from the rail 106. For example, the user can remove an item 104 from a carrier 102 and the carrier 102 can remain on the rail 106 and can continue to be moved around the rail 106 after the item 104 has been removed.

In some embodiments, the items 104 can be partially or wholly ejected from the carriers 102 to allow for easier access to the items 104. For example, the items 104 can be partially ejected from the carriers 102 such that a user does not need to reach into the carriers 102 to remove the item 104. In some examples, suitable components for facilitating such ejection may be at least partially disposed in the secondary area 208 (in a portion within the continuous loop defined by the rail 106).

The packaging area 214 can be or include an area for positioning packaging (e.g., packaging from the items 104). For example, a user can remove an item 104 from a carrier and remove the packaging of the item 104. The packaging can then be positioned in the packaging area (e.g., for recycling the packaging and/or reusing the packaging). In some embodiments, the packaging area 214 can be or include a container for collecting the packaging. However, the packaging area 214 may be or include a designated area for putting packaging so that it does not interfere with a user (e.g., when the user is driving or interacting with the carriers 102).

Figure 3B:
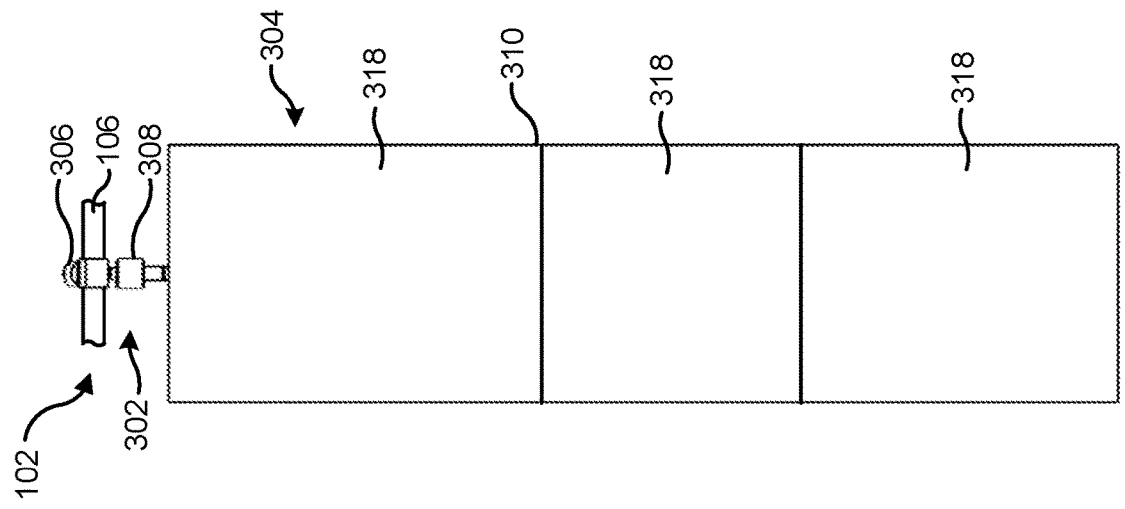
FIGS. 3B and 3C are front views that illustrate the hanging carrier of FIG. 3A, according to various embodiments.
Figure 3A:
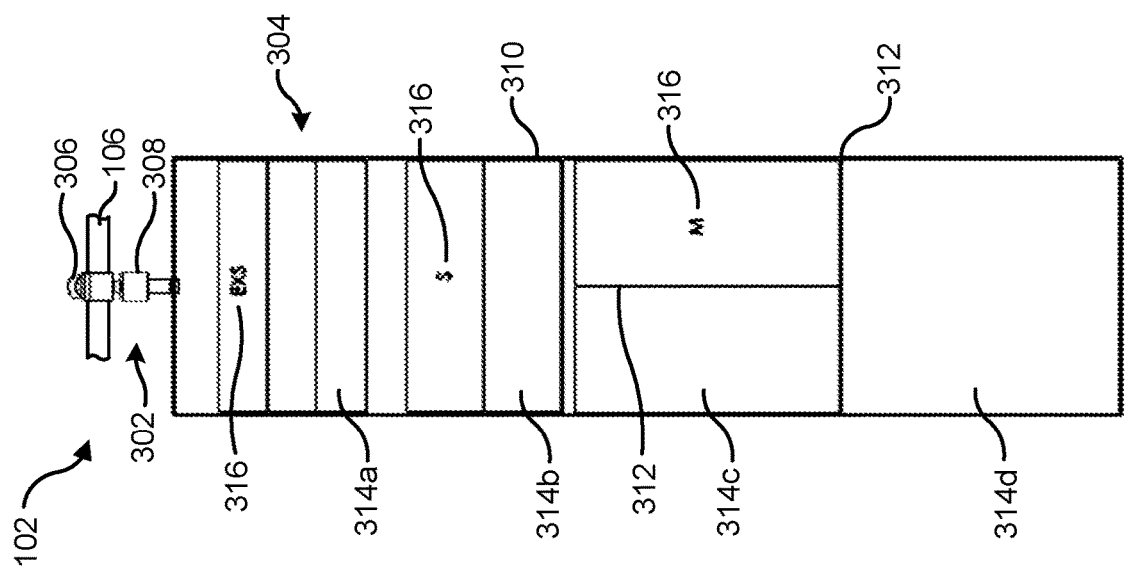
FIG. 3A is a back view that illustrates a hanging carrier for use with the item delivery system of FIG. 1, according to various embodiments.
Figure 3D:
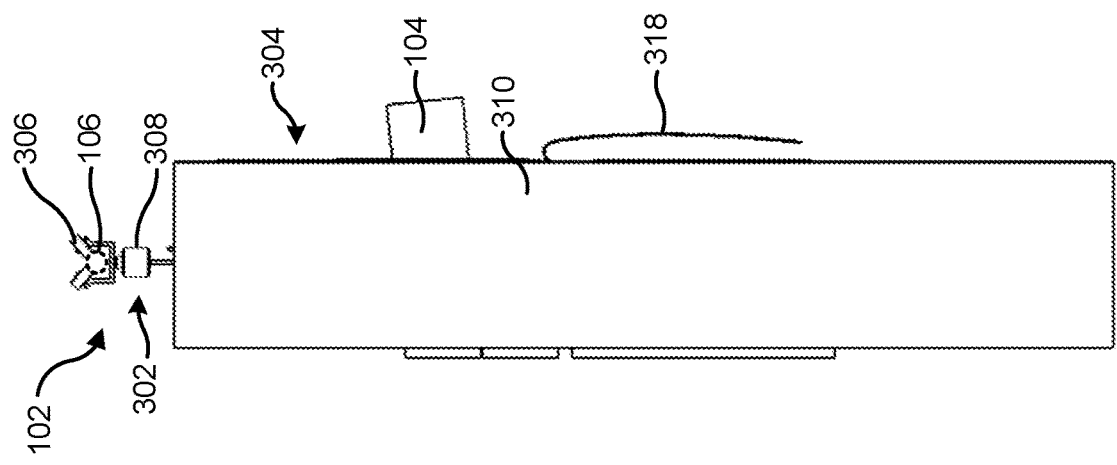
FIG. 3D is a side view that illustrate a hanging carrier of FIG. 3A, according to various embodiments.

Turning to FIGS. 3A through 3D, an example carrier 102 is shown. The carrier 102 is shown from a back view in FIG. 3A, front views in different states in FIGS. 3B and 3C, and from a side view in FIG. 3D. The back of the carriers 102 can be or include a side of the carrier 102 where the items 104 can be inserted. The carriers 102 can include a yoke 302 attached to a carrier body 304. The yoke 302 can include one or more rail attachments 306 and an engagement area 308. The rail attachments 306 can be or include a device that can allow the carrier 102 to hang on the rail 106 and/or move along the rail 106. For example, as shown in FIG. 3D, the rail attachments 306 can be or include wheels that can be positioned on the upper half of the rail 106 and can allow the carrier 102 to move along the rail 106. The wheels can be spaced apart to pass by supports that can attach the rail 106 to the item delivery vehicle 110, for example.

The engagement area 308 can be or include a device that can engage with the advancement devices 108. For example, the engagement area 308 can include a solid or semi-solid material (e.g., a dog) that can be contacted by a portion of the advancement devices 108 (e.g., by an arm of the advancement devices 108). The engagement area 308 can additionally or alternatively include a loop, a hook, an adhesive, and/or any suitable material to aid in engagement of the advancement devices 108 with the yoke 302.

The carrier body 304 can include, for example, sidewalls 310 and dividers 312. In various embodiments, the sidewalls 310 and/or the dividers 312 can be or include rigid and/or semi-rigid material. In some embodiments, the dividers 312 can be or include material that is more rigid than the material of the sidewalls 310. For example, the sidewalls 310 can be or include cloth and the dividers can be or include plastic. However, the sidewalls 310 and/or the dividers 312 can be or include fabric, plastic, metal, carbon-fiber, and/or any suitable rigid or semi-rigid material.

The dividers 312 can be used to divide the carrier body 304 into item slots 314. FIG. 3A shows the carrier 102 with exposed item slots 314 (e.g., for loading items 104 into the item slots 314). The dividers 312 can extend between the sidewalls 310 (e.g., in a horizontal orientation) and/or can extend between other dividers (e.g., in a vertical orientation).

The item slots 314 can receive one or more items 104. For example, the item slots 314 can receive items 104 of various sizes. The item slots 314 can be different sizes (e.g., to accommodate items 104 of different sizes), however, the item slots 314 may be uniform sizes. In various embodiments, for example as shown in FIG. 3A, the carrier 102 can include extra-small item slots 314a (e.g., for extra-small sized items 104), small item slots 314b (e.g., for small sized items 104), medium item slots 314c (e.g., for medium sized items 104), and large item slots 314d (e.g., for large sized items 104).

In some embodiments, the item slots 314 can include markings 316. For example, the markings 316 can be visible on the side of the carrier 102 where the items 104 can be inserted. However, the markings 316 can be on any of the sides of the carrier 102. The markings 316 can indicate the size of the item slot 314 and/or the item 104 to be put in an item slot 314; information associated with the item 104 and/or the item slot 314; and/or information associated with a user order. For example, the markings 316 can differentiate the item slot 314 between extra-small, small, medium, and large item slots 314.

The item slots 314 can be covered, for example, on one side by one or more coverings 318. For example, as shown in FIG. 3B, the coverings 318 can be positioned on the opposing side of the carrier 102 from the side where items 104 are inserted. However, the coverings 318 may be positioned on multiple sides (e.g., on both the side where the items 104 are inserted and the opposing side). The coverings 318 can be used to cover an opening of the item slot 314 and prevent the items 104 from falling out of the item slots 314. Multiple coverings 318 can be used to cover the item slots 314, however, a single covering 318 may cover all of the item slots 314.

Figure 3C:
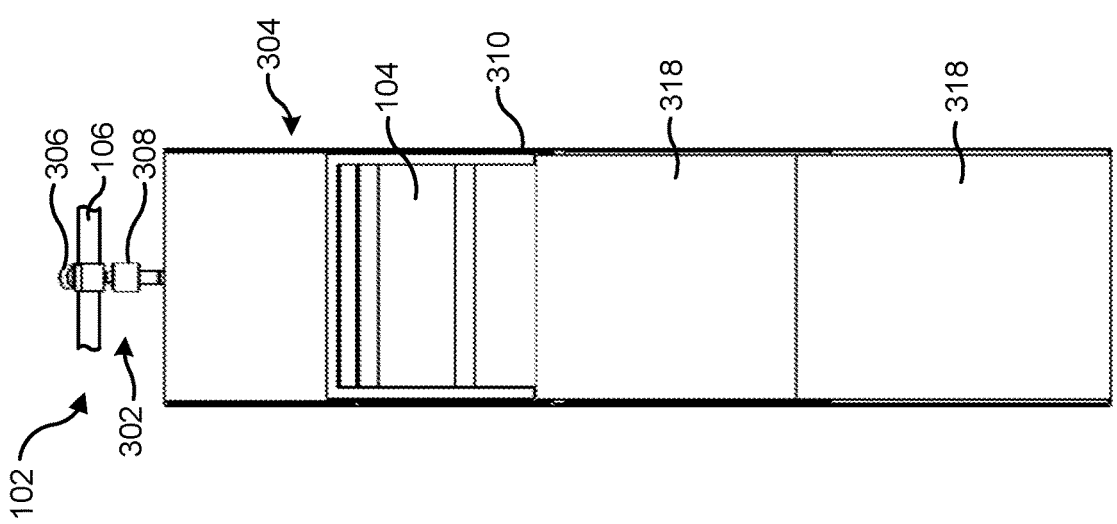

The coverings 318 can be removed to allow access to one or more of the item slots 314. For example, as shown in FIGS. 3C and 3D, the coverings 318 can be removed to access one or more of the items 104. Removal of the coverings 318 can allow a user to remove the items 104 from the item slots 314. For example, the coverings 318 can be removed when the carriers 102 are positioned at the item removal position. The coverings 318 can be attached to the sidewalls 310 using hook and loop connectors, snaps, magnets, latches, buttons, zippers, adhesives, and/or any suitable connecting device.

In various embodiments, the coverings 318 and/or the item slots 314 can include or be associated with an indicator that can indicate which item 104 a user should interact with. For example, the indicator can indicate which item slot 314 contains the item 104 that a user should remove. The indicator can be or include a visual indicator and/or an audio indicator. For example, the indicator can be or include a light that can illuminate the item slot 314 that contains the item 104 that should be removed. The indicator can additionally or alternatively include a speaker that can play an audio cue to indicate the item slot 314 that should be interacted with. In some examples, the indicator additionally or alternatively may be provided remote from the coverings 318 and/or the item slots 314. For example, the indicator may be capable of shining a light from the item removal area 212 or other suitable location and onto the target covering 318, item slot 314, and/or item 104. In some examples, the indicator may be capable of interacting with different carriers 102. For example, the indicator may remain adjacent the item removal area 212 and be capable of adjusting a beam of light to indicate one target location relative to a first carrier 102 when presented at the item removal area 212 and then adjust again to locate another target location relative to a second carrier 102 when presented at the item removal area 212.

Figure 4A:
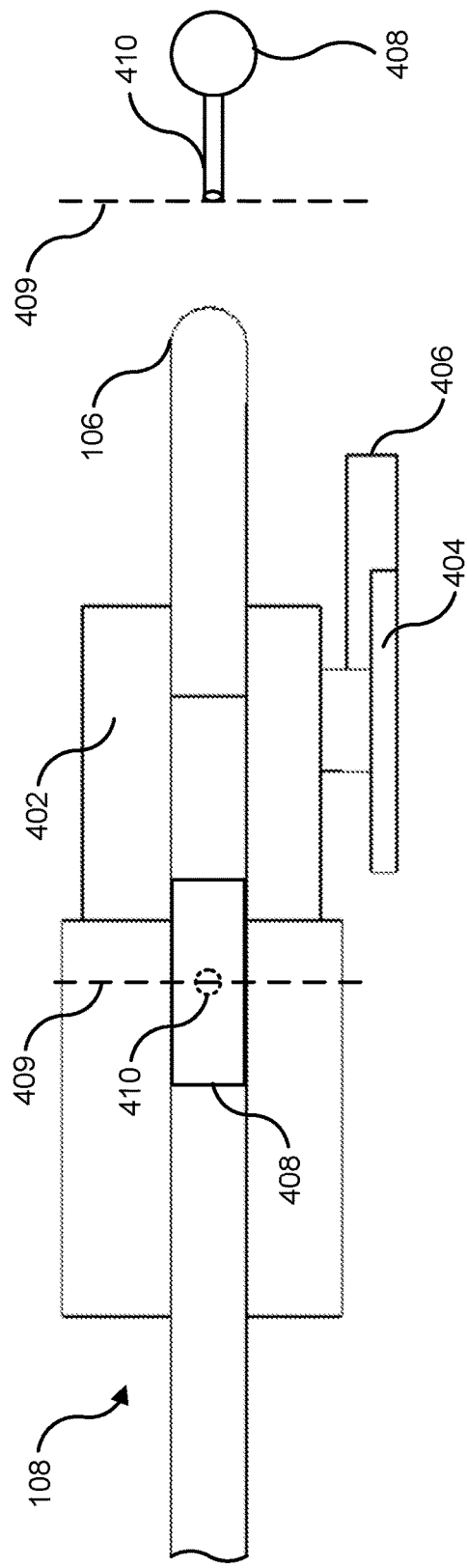
FIGS. 4A and 4B are side views that illustrate stops for use with the item delivery system of FIG. 1, according to various embodiments.
Figure 4B:
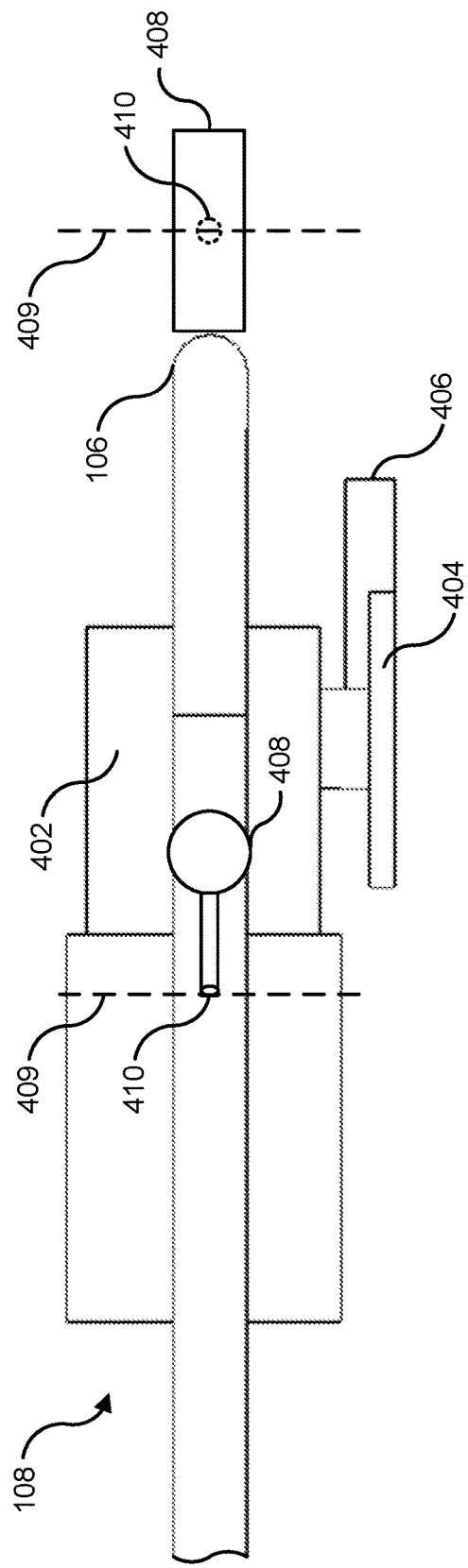

Turning to FIGS. 4A and 4B, side views of an example advancement device 108 is shown. The advancement device 108 can include a motor 402 attached to a rotating disk 404. The rotating disk 404 can be attached to an arm 406 that can engage with the carrier 102. For example, the arm 406 can engage with the engagement area 308 of the yoke 302. The disk 404 can rotate the arm 406 to advance the carrier 102 along the rail 106. For example, the disk 404 can rotate the arm 406 to index the carriers 102.

The advancement device 108 can move the carriers 102 in one or more directions. For example, the advancement device 108 can move the carriers 102 clockwise and counterclockwise around the rail 106. However, the advancement device 108 may move the carriers 102 in one direction (e.g., either clockwise or counter-clockwise around the rail 106). Moving the carriers 102 in multiple directions can allow the carriers 102 to be indexed forward and backwards around the rail 106. For example, the carriers 102 can be indexed one position forward and/or one position backward around the rail 106.

The stops 408 can move between an open position (as shown in FIG. 4A) and a closed position (as shown in FIG. 4B). In various embodiments, the stops 408 can be connected to arms 410. The arms 410 can be used to move the stops 408 between the open and closed positions. For example, the arms 410 can be used to rotate the stops 408 between the open and closed positions. The stops 408 can rotate about rotation axes 409. However, the stops 408 can be attached to actuators, pneumatic actuators, rotors, motors, springs, and/or any suitable device for moving the stops 408.

In the open position, (e.g., as shown in FIG. 4A) the stops 408 can be positioned away from the rail 106. In the open position, the stops 408 can allow the carriers 102 to travel along the rail 106. For example, in the open position, the stops 408 can allow the rail attachments 306 to travel along the rail 106 unimpeded. In the closed position, the stops 408 can be positioned (e.g., positioned against or adjacent the rail) to prevent carriers 102 from moving along the rail 106. For example, in the closed position, the stops 408 can impede the rail attachments 306 and prevent the rail attachments 306 from moving along the rail 106.

FIGS. 5A through 5E show examples of how the stops 408 can be used with the advancement device 108 to index the carriers 102. However, the stops 408 may be not positioned in all of the positions shown in FIGS. 5A through 5E while the carriers 102 are moved around the rail 106. Indexing the carriers 102 can include moving the carriers 102 from the position of the carrier 102 shown in FIG. 5A to the position of the carrier 102 shown in FIG. 5E (e.g., around a corner portion 508 of the rail 106).

The carriers 102 can be indexed by coordinating the advancement device 108 and the stops 408. For example, the carriers 102 can be indexed by opening and closing the stops 408 to allow only one carrier 102 at a time to move between the stops 408 (e.g., can allow only one carrier at a time to move around the corner portion 508). In various embodiments with multiple advancement devices 108 and stops 408 positioned around multiple corner portions 508 (e.g., embodiments similar to the embodiment shown in FIG. 2), the advancement devices 108 and the stops 408 can be coordinated to index all of the carriers 102 on the rail 106. For example, some or all of the advancement devices 108 and/or some or all of the stops 408 can be coordinated to index the carriers 102 around the rail 106. The advancement devices 108 and/or the stops 408 can be coordinated such that a carrier 102 is moved around each of the corner portions 508 at the same time. Coordination of the advancement devices 108 and/or the stops 408 can index the carriers 102 around the rail 106, for example, by moving the carriers 102 one position clockwise and/or counter-clockwise. For example, indexing the carriers 102 around the rail 106 can include successively positioning each of the carriers 102 at the item unloading position.

The advancement device 108 can be continuously moving while the carriers 102 are being indexed. For example, the advancement device 108 can continue to move (e.g., in a counterclockwise direction) from the position shown in FIG. 5E until it reaches the position shown in FIG. 5A. The advancement device 108 can remain in motion until the desired number of carriers 102 have been indexed (e.g., a desired carrier 102 is positioned in the item unloading position).

Figure 5B:
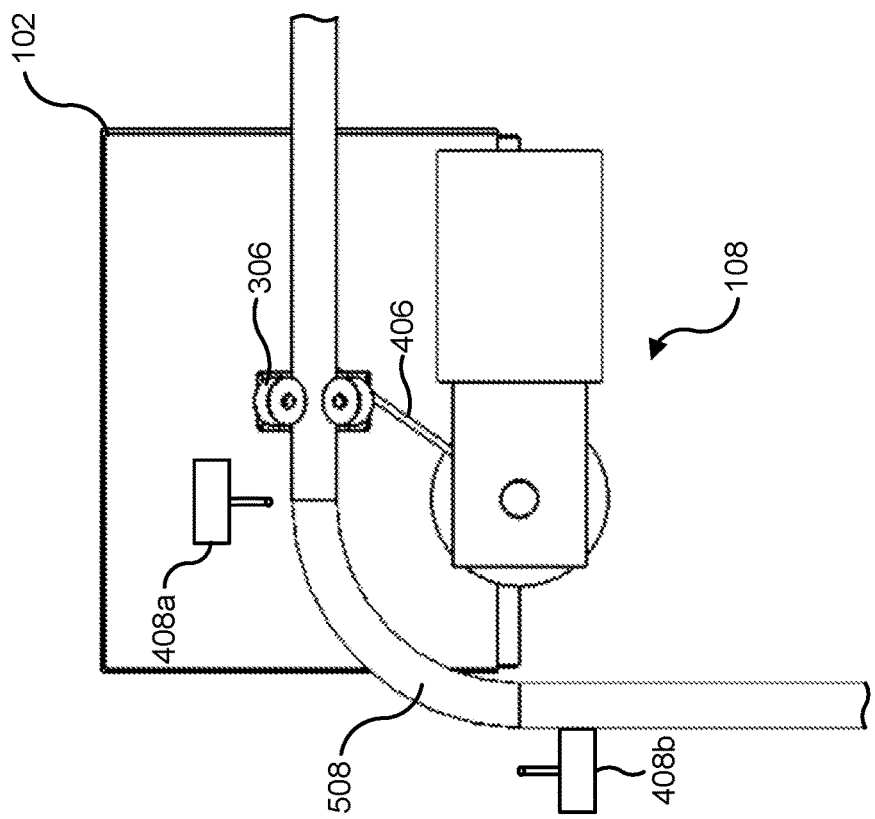
Figure 5A:
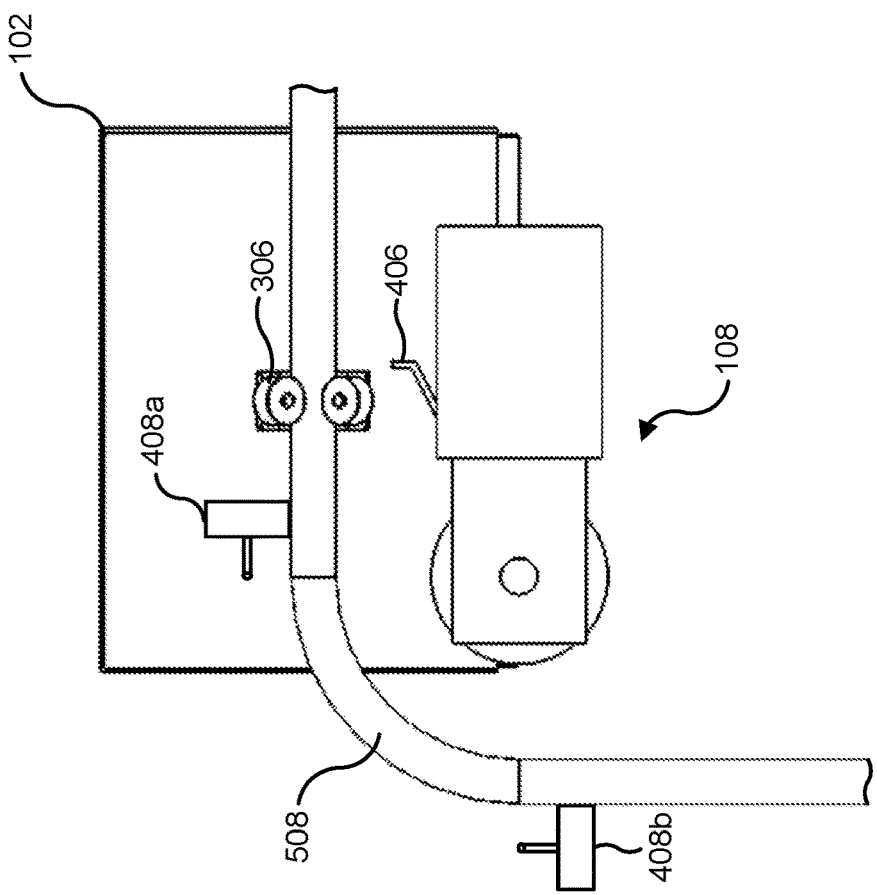

FIG. 5A shows first and second stops 408a and 408b in the closed position. The first and second stops 408a, 408b can be in the closed position to prevent the carriers 102 from moving. For example, the first and second stops 408a, 408b can be in the closed position to prevent the carriers 102 from moving out of position (e.g., out of the item removal position). Additionally or alternatively, the first and second stops 408a, 408b can be in the closed position to prevent the carriers 102 from moving when the item delivery vehicle 110 is moving (e.g., between stops along a delivery route). In the excerpt shown in FIG. 5A, the first stop 408a can prevent the first carrier 102a from moving counterclockwise around the bend of the corner portion of the rail 106.

FIG. 5B shows a first stop 408a moved to an open position. The arm 406 of the advancement device 108 can engage with the carrier 102 (e.g., with the engagement area 308 of the yoke 302). The advancement device 108 can advance the carrier 102 along the rail 106, for example, to a position past the first stop 408a. The advancing of the carrier 102 can move all of the carriers 102 on the rail 106 forward one position (e.g., indexing the carriers 102 forward one space).

As shown in FIG. 5C, the first stop 408a can close once the carrier 102 has been moved past the first stop 408a (e.g., by the advancement device 108). The advancement device 108 can continue to advance the carrier 102 after the first stop 408a has closed. For example, the first stop 408a can close the advancement device 108 can continue to advance the carrier 102 towards the second stop 408b which can open before the carrier 102 reaches the second stop 408b. However, the carrier 102 can be stopped between the first and second stops 408a, 408b. When the carrier 102 is stopped, the first and second stops 408a, 408b can be closed to prevent the carrier 102 from moving forward or backward. In some embodiments, the second stop 408b can open at the same time the first stop 408a closes. For example, the second stop 408b would be in the position shown in FIG. 5D when the carrier 102 is in the position shown in FIG. 5C.

Figure 5E:
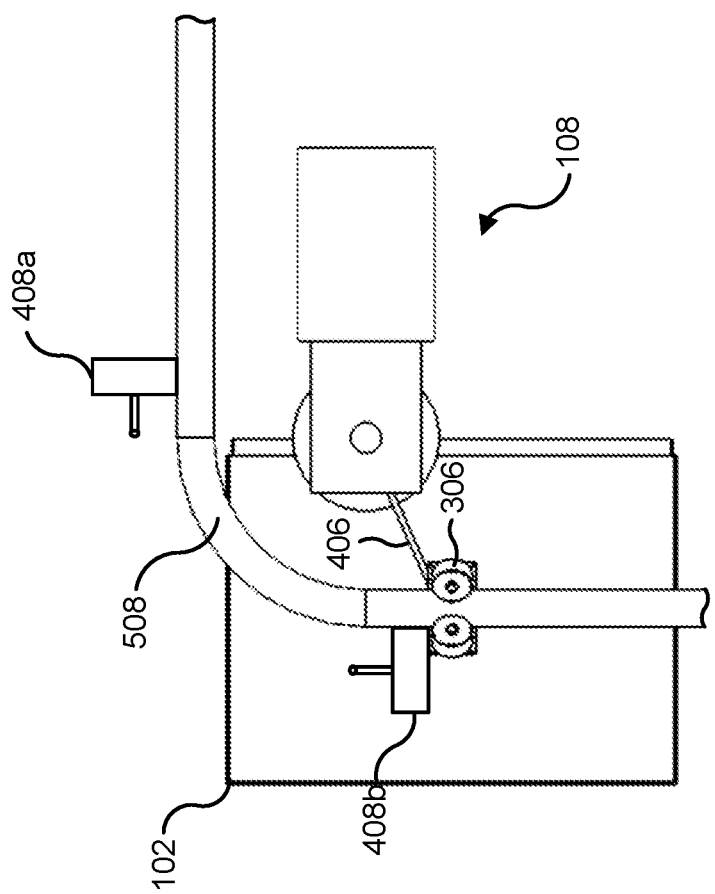

As shown in FIG. 5D, the second stop 408b can open and the carrier 102 can be advanced past the second stop 408b (e.g., by the advancement device 108). After the carrier 102 has been advanced past the second stop 408b, the second stop 408b can close, as shown in FIG. 5E. The second stop 408b in the closed position can prevent the carrier 102 from moving backwards (e.g., in the opposite direction the carrier 102 was moved by the advancement device 108).

Figure 6:
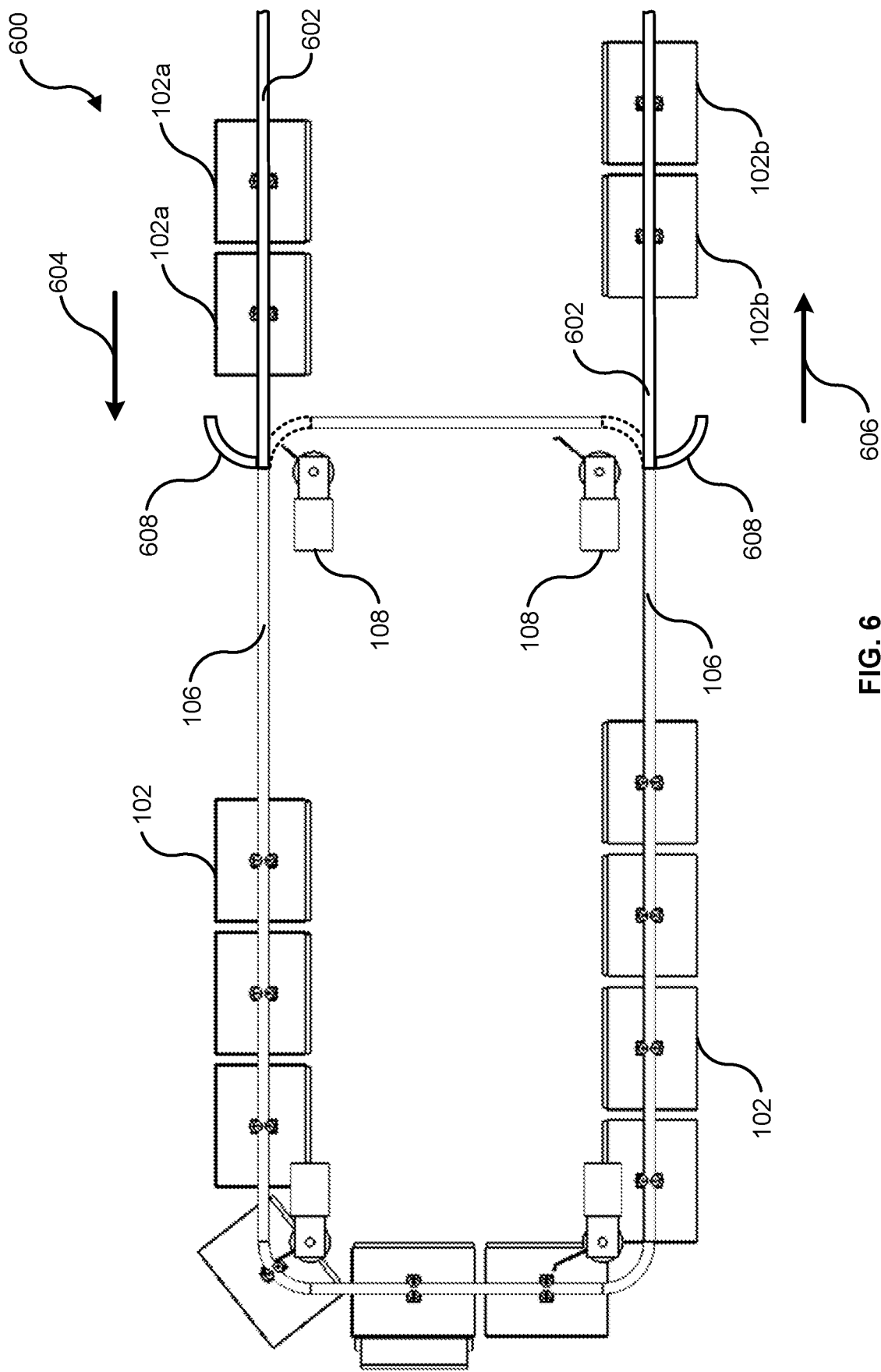
FIG. 6 is a top view that illustrates a portion of an external loading device for use with the item delivery system of FIG. 1, according to various embodiments.

Turning to FIG. 6, a portion of an external loading device 600 is shown. The external loading device 600 can be external to the item delivery vehicle 110 and/or the item delivery system 100. The external loading device 600 can engage with the item delivery system 100 to load and/or unload carriers 102 into and/or out of the item delivery system 100. For example, the external loading device 600 can load carriers 102 filled with items 104 into the item delivery system 100 (e.g., onto the rail 106) and/or can unload empty and/or partially empty carriers 102 from the item delivery system 100 (e.g., off of the rail 106).

The external loading device 600 can include one or more rails 602. For example, a first rail 602 can be used to load carriers 102 (e.g., carriers 102a) onto the rail 106 (e.g., in direction 604) and a second rail 602 can be used to unload carriers 102 (e.g., carriers 102b) from off of the rail 106 (e.g., in direction 606). The carriers 102a being loaded onto the rail 106 can be filled with items 104. For example, the carriers 102a can be filled prior to loading the carriers 102a onto the rail 106. The carriers 102b being unloaded from the rail 106 can be empty. For example, the carriers 102b can be emptied by delivering the items 104 to customers. The empty carriers 102b can then be filled with items 104 and loaded onto one or more rails 106.

In various embodiments, the external loading device 600 can engage with the rails 106. In some embodiments, one or more moveable portions 608 of the rail 106 can move to accommodate the external loading device 600 (e.g., to receive rails 602). For example, the moveable portions 608 of rail 106 can move (e.g., pivot) to allow the rails 602 to engage with a straight portion of the rails 106. After the carriers 102 have been loaded onto and/or off of the rail, the moveable portions 608 can be moved into position to form the rail 106. In various embodiments, the moveable portions 608 can be or include the corner portions 508 of the rail 106.

Figure 7:
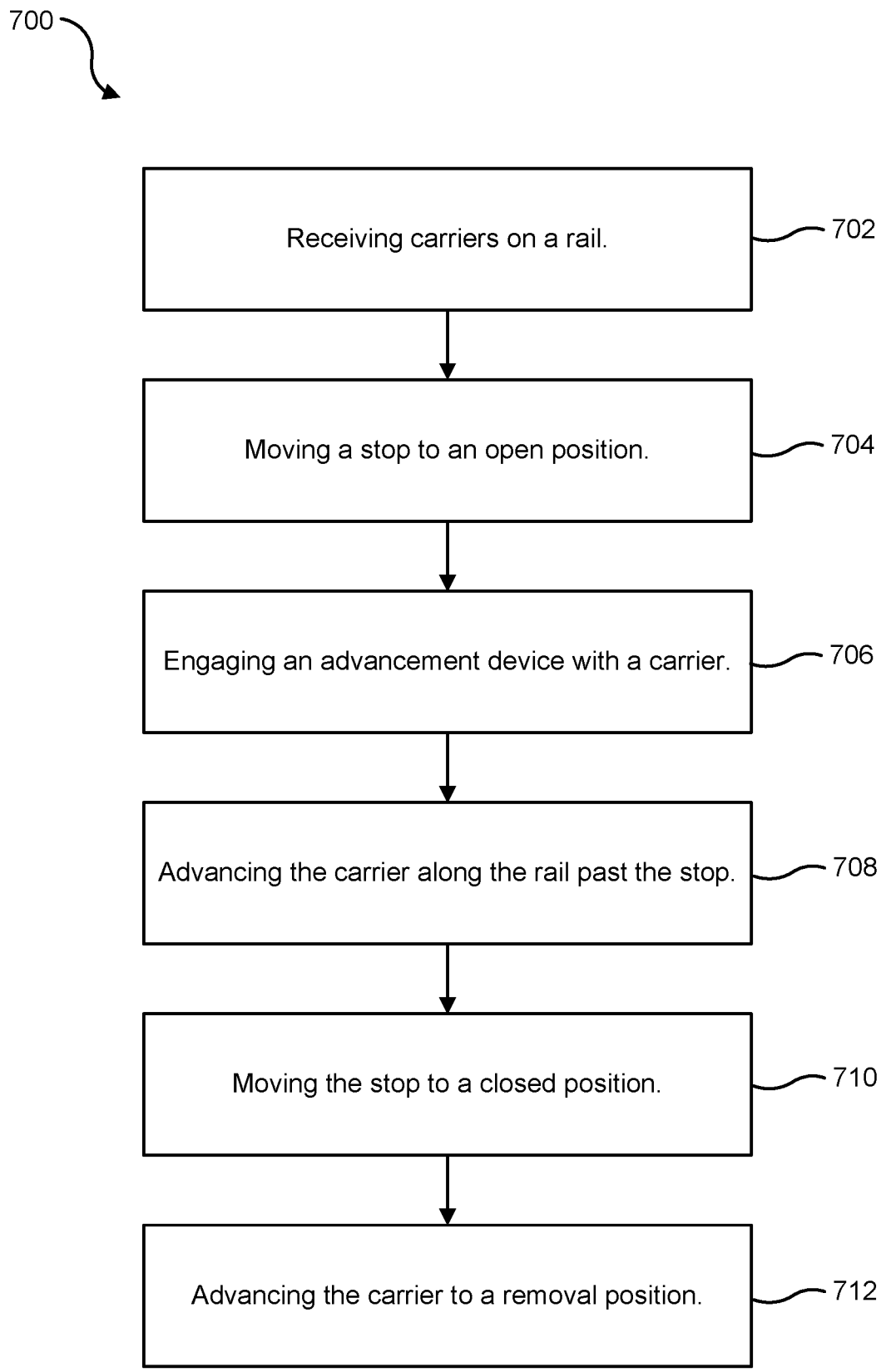
FIG. 7 is a flowchart illustrating a process for moving items to a retrieval position using the item delivery system of FIG. 1, according to various embodiments.

FIG. 7 illustrates a flow diagram depicting a process 700 for implementing techniques relating to delivering items using an item delivery system (e.g., item delivery system 100), according to at least one example.

The process 700 can begin at 702 with receiving carriers (e.g., carriers 102) on a rail (e.g., rail 106). The carriers 102 can be received from an external loading device (e.g., external loading device 600). However, the carriers 102 can be positioned on the rail 106 manually, by a robotic manipulator, and/or by any suitable loading device. The carriers 102 can be filled with items (e.g., items 104). Carriers 102 can be positioned on the rail 106 until the rail is filled (e.g., until the carriers 102 are touching one another).

The process 700 at 704 can include moving a stop (e.g., stop 408) to an open position. In the open position, the stop 408 can allow the carriers 102 to be moved past the stop 408 (e.g., along the rail 106).

The process 700 at 706 can include engaging an advancement device (e.g., advancement device 108) with a carrier 102. The advancement device 108 can engage with the carrier 102 to move the carrier 102 along the rail 106. The advancement device 108 can include an arm (e.g., arm 406) that can engage with a yoke 302 of the carrier 102.

The process 700 at 708 can include advancing the carrier 102 along the rail 106 past (e.g., downstream from) the stop 408. The carrier 102 can be advanced by the advancement device 108.

The process 700 at 710 can include moving the stop 408 to a closed position. In the closed position, the stop 408 can prevent the carrier 102 from moving along the rail 106. For example, the stop 408 can prevent the carrier 102 from moving upstream along the rail 106 and/or the stop 408 can prevent another carrier 102 from moving downstream along the rail 106.

The process 700 at 712 can include advancing the carrier 102 (e.g., along the rail 106) to a removal position. In the removal position, one or more items 104 can be removed from the carrier 102. For example, a user can remove the one or more items 104 from the carrier 102.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An item delivery system positioned in an item delivery vehicle, the item delivery system comprising:
   hanging carriers, each of the hanging carriers comprising a yoke and a carrier body, each of the carrier bodies comprising semi-rigid sidewalls and rigid dividers extending between the sidewalls and defining item slots configured to receive items;

a rail positioned in the item delivery vehicle and defining a continuous pathway, the rail configured to receive the yokes of the hanging carriers and comprising straight portions coupled to one another with corner portions to form a continuous loop; and a plurality of advancement devices configured to engage with the yokes of the hanging carriers to advance the hanging carriers along the continuous pathway in a first direction to an unloading position, wherein in the unloading position the hanging carriers are accessible from a driver area of the item delivery vehicle for removal of one or more items from the item slots.

2. The item delivery system of claim 1, further comprising stops moveable between an open position and a closed position, wherein in the open position the stops allow movement of the hanging carriers and in the closed position the stops prevent movement of the hanging carriers.

3. The item delivery system of claim 1, wherein the rail is further configured to engage with an external loading device, the external loading device configured to deposit hanging carriers filled with items onto the rail and receive empty hanging carriers from the rail.

4. The item delivery system of claim 1, wherein the plurality of advancement devices are further configured to engage with the hanging carriers to advance the hanging carriers in a second direction opposite the first direction.

5. The item delivery system of claim 1, wherein the plurality of advancement devices are configured to index the hanging carriers along the continuous pathway.

6. The item delivery system of claim 1, wherein an advancement device of the plurality of advancement devices comprises an arm coupled with a rotating disk, the disk configured to rotate the arm to engage the arm with the yoke of the hanging carriers.

7. An item delivery system comprising:
a hanging carrier comprising rigid or semi-rigid sidewalls and rigid or semi-rigid dividers defining item slots, each of the item slots configured to receive one or more items;

a rail positionable in an item delivery vehicle, the rail defining a continuous pathway and being configured to receive a portion of the hanging carrier, the rail comprising a plurality of rail portions coupled to one another, at least one rail portion of the plurality rail portions being movable to allow an external loading device to engage with the at least one rail portion; and an advancement device configured to engage with the portion of the hanging carrier to move the hanging carrier along the continuous pathway defined by the rail to an unloading position for removal of the one or more items from within the hanging carrier.

8. The item delivery system of claim 7, wherein when the hanging carrier is in the unloading position, the item slots are accessible from an operator's area of the item delivery vehicle.

9. The item delivery system of claim 7, wherein the plurality of rail portions comprises straight portions coupled to one another with corner portions.

10. The item delivery system of claim 9, wherein the at least one rail portion is a corner portion of the plurality of rail portions.

11. The item delivery system of claim 7, wherein the hanging carrier further comprises a cover positionable over an opening of one or more of the item slots.

12. The item delivery system of claim 7, wherein the one or more items are removable from the hanging carrier without removing the hanging carrier from the rail.

13. The item delivery system of claim 7, further comprising an indicator configured to identify one or more items for removal from one or more of the item slots when the hanging carrier is positioned in the unloading position.

14. The item delivery system of claim 7, further comprising stops configured for synchronized movement with the advancement device for indexing of the hanging carrier, the stops moveable between a closed position and an open position, wherein in the closed position the stops prevent movement of the hanging carrier and in the open position the stops allow movement of the hanging carrier along the continuous pathway.

15. A method comprising:
receiving hanging carriers onto a rail defining a continuous pathway, the hanging carriers comprising semi-rigid sidewalls and rigid or semi-rigid dividers defining item slots, each of the item slots configured to receive one or more items;

moving a first stop positioned adjacent to the rail to an open position;

engaging an advancement device with a portion of a hanging carrier of the hanging carriers;

advancing, with the advancement device, the hanging carrier along the rail past the first stop;

moving the first stop to a closed position; and advancing, with the advancement device, the hanging carrier to a removal position for removal of an item of the one or more items from an item slot.

16. The method of claim 15, further comprising:
permitting removal of the item from the item slot; and
advancing a second hanging carrier to the removal position for removal of another item.

17. The method of claim 15, further comprising:
moving a second stop positioned adjacent to the rail to an open position;
advancing, with the advancement device, the hanging carrier along the rail past the second stop; and
moving the second stop to a closed position.

18. The method of claim 15, wherein receiving the hanging carriers onto the rail comprises engaging a portion of an external loading device with the rail and unloading the hanging carriers onto the rail.

19. The method of claim 15, further comprising removing the hanging carriers off of the rail, the removing comprising engaging a portion of an external loading device with the rail and receiving the hanging carriers from the rail.

20. The method of claim 15, further comprising, when the hanging carrier is in the removal position, identifying an item of the one or more items for removal by a user.

* * * * *